Figure 1:
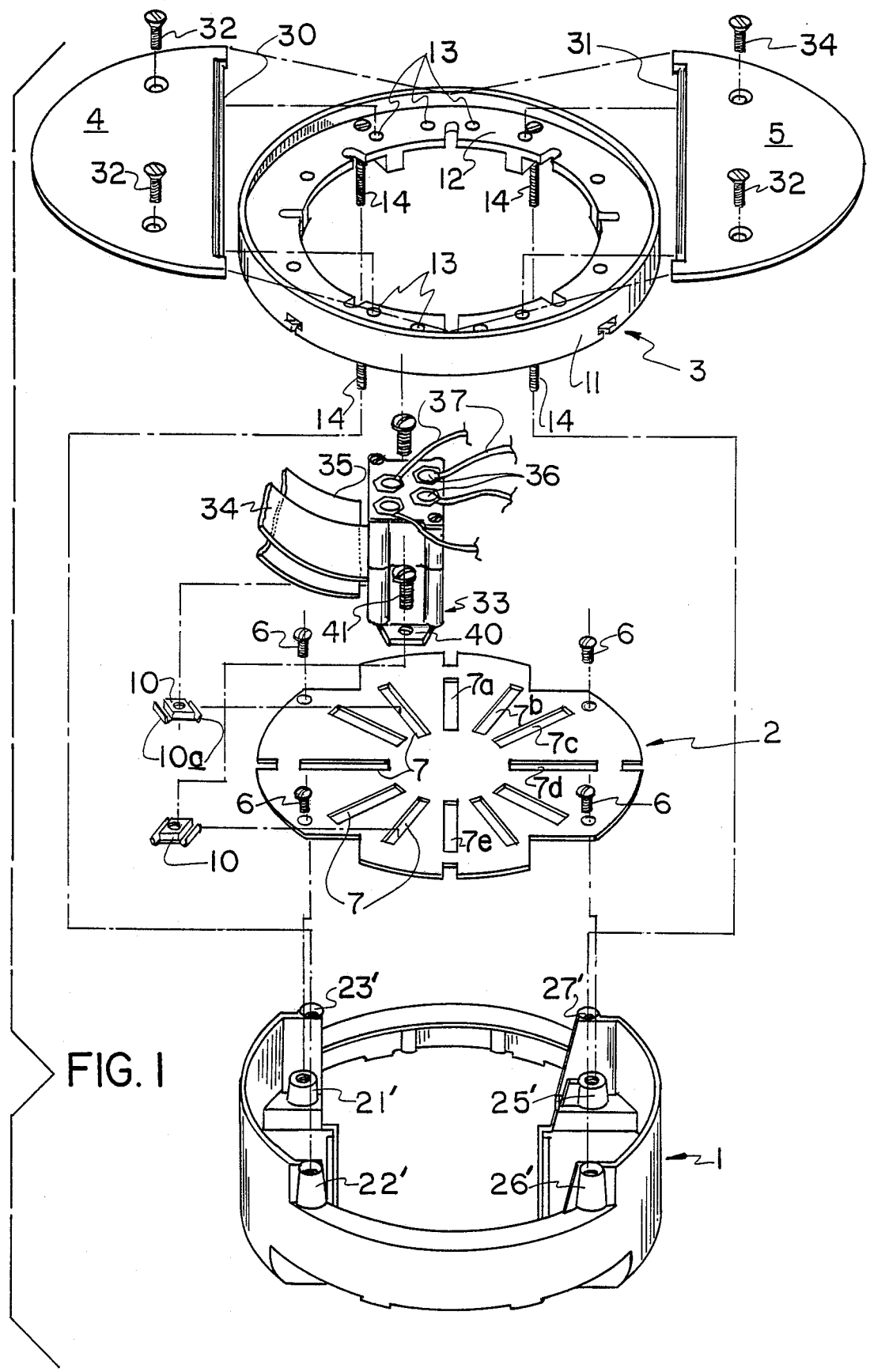

United States Patent [19]
Benscoter

[11] Patent Number: 4,746,768
[45] Date of Patent: May 24, 1988

[54] RECESSED INSERT FOR CONNECTING FLAT CONDUCTOR CABLE TO A CELLULAR RACEWAY

[75] Inventor: Richard D. Benscoter, Vienna, W. Va.

[73] Assignee: Butler Manufacturing Company, Kansas City, Mo.

[21] Appl. No.: 99,721

[22] Filed: Sep. 22, 1987

Related U.S. Application Data

[63] Continuation of Ser. No. 944,014, Dec. 22, 1986.

[51] Int. Cl.$^4$ .............................................. H02G 3/12
[52] U.S. Cl. .................................................... 174/48
[58] Field of Search ...................... 174/48, 49; 52/221

[56] References Cited

U.S. PATENT DOCUMENTS

| | | | |
|---|---|---|---|
| 3,322,442 | 5/1967 | Flachbarth | 52/221 X |
| 3,873,136 | 3/1975 | Curry | 174/48 X |
| 4,443,654 | 4/1984 | Flachbarth et al. | 174/48 |
| 4,591,656 | 5/1986 | Mohr | 174/48 |
| 4,638,115 | 1/1987 | Benscoter | 174/48 |

Primary Examiner—Arthur T. Grimley
Assistant Examiner—David A. Tone
Attorney, Agent, or Firm—Frederick J. Olsson

[57] ABSTRACT

Insert has a plate member supporting one or more transition blocks for interconnecting power conductors from the power cell to the conductors of a flat cable together with an adjusting ring supporting a cover with a cable exit slot. The cover, the adjusting ring, and the transition block provide for the cover and transition block to be angularly oriented to correspond to the direction from which the flat conductor cable exits to the insert. The arrangement provides for the flat connector cable to exit the insert from several different azimuthal directions and with the power conductors being connectible with the transition block.

3 Claims, 1 Drawing Sheet

RECESSED INSERT FOR CONNECTING FLAT CONDUCTOR CABLE TO A CELLULAR RACEWAY

This application is a continuation of my application Ser. No. 944,014 filed Dec. 22, 1986 now abandoned.

This invention relates in general to electrical in-floor power and communication distribution systems for office buildings and the like and particularly to insert means for such systems.

The principal objective of the invention is to provide insert means which enables the feeding of under-carpet flat conductor cable from an in-floor or underfloor electrical distribution system.

The invention has special utility in cases where the electrical distribution in a building floor is an in-floor or underfloor system and it is desired to power-activate one or more floor stations which are not located over the distribution system.

The invention contemplates insert means having a plate member supporting one or more transition blocks for interconnecting power conductors from the power cell to the conductors of a flat cable together with an adjusting ring supporting cover means with a cable exit slot, the cover means, the adjusting ring, and the transition block providing for the cover means and transition block to be angularly oriented to correspond to the direction from which the flat conductor cable exist the insert. The arrangement provides for the flat connector cable to exit the insert from several different azimuthal directions and with the power conductors being connectible with the transition block in any of its orientations. The elongated slots accomodate the different sizes of transition blocks which are used with conventional multiple conductor cables.

The afterset will be described below in connection with FIG. 1 which is an exploded view of an afterset employing the invention.

While the invention will be described in afterset form, it will be appreciated as the description proceeds, that the structure is readily adaptable for preset form.

Inserts of the invention can be employed with raceway having one, two, or three cells. As shown herein, the afterset is arranged for use with a three-cell raceway having a power cell and communication cells on opposite sides of the power cell.

The base component of the afterset which connects the same to the cellular raceway is the same (with certain modifications) as disclosed in application of Gregory L. Mohr entitled THREE SERVICE RECESSED AFTERSET having Ser. No. 99,720 and assigned to the assignee of this invention. Also, it is to be noted here that the raceway shown in said application Ser. No. 99,720 is the type wherein the crest of the power cell is lower than the crests of the communication cells.

The insert of the invention comprises four main parts. For the afterset of FIG. 1, these parts include the base 1, the mounting plate 2, the adjusting ring 3, and a slotted cover in the form of semicircular cover plates 4 and 5.

The base 1 is the same as the base 1 shown in application Ser. No. 99,720 except that the inboard standards have been reduced in height as will be noted for the corresponding standards 21' and 25'. The particular form of base is not critical, it being primarily necessary that the base have threaded holes for receiving adjusting screws and have means for locking the base to the cellular raceway. In cases where the invention is employed in a preset, the base 1 is configured with a vertically extending side wall to act as a barrier against the entry of concrete during the pour. Thus, the term base as employed herein will be construed as referring to a housing as above mentioned.

The mounting plate 2 is generally flat and is configured to rest in the inboard standards and be secured in place by the screws 6. The plate 2 has a plurality of radially extending slots 7 which are preferably equally spaced apart in this particular embodiment, the angular space is 30°. Each slot 7 is adapted to receive slide nuts such as slide nut 10. These nuts are conventional items which are mounted by being pushed down into the slot and then twisted 90° so that the tracks 10a mate with the edges of the slot. The unit can be positioned along the slot and the nut held against rotation.

The adjusting ring 3 is formed with an outer wall 11, a support flange 12 extending inwardly and having a plurality of threaded holes 13 which in effect constitute nut means. The ring 3 carries adjusting screws 14 in a manner the same as the adjusting screws 57 in application Ser. No. 99,720. The adjusting screws fit into the threaded hole in the outboard standard 22'/23' and 26'/27' similarly as in said application.

The cover plates 4 and 5 are of semi-circular configuration and are adapted to be mounted in the support flange 12 with the peripheral edge closely adjacent the outer wall 11. As mounted, the covers are flush with the top edge of the wall 11. The abutting edges of the cover are respectively slotted at 30 and 31 which form an elongated opening for the flat conductor cable and its sheath. The covers are held in position by the screws 32 extending through the cover and into threaded holes 13.

The transition block 33 is of conventional form and on the lower portion mounts the inner end of a flat cable conductor 34 and protective sheath 35. The terminals 36 on the top of the block receive the power conductors 37. At opposite ends of the transition block are mounting feet, one of which is shown at 40. The feet receive the bolts 41 which thread into the slide nuts 10 for securing the transition block in position.

Referring to the support plate 2, it will be observed that the slots are oriented and arranged in azimuth similarly as the number on a clock face; i.e. the slot 7a being at twelve, the slot 7b being at one, the slot 7c being at two, and the slot 7d being at three, etc.

Projecting the axes of the slots 7a, 7b, etc., radially outwardly, it will be apparant that a flat conductor cable can be oriented on the floor of a room so that its axis is in a vertical plane containing the axis of slot 7a, or slot 7b, etc. Thus, the flat conductor cable can be considered as exiting or coming in at 12 o'clock, or one o'clock, two o'clock, etc. In the particular arrangement shown, the flat conductor cable comes in at nine o'clock.

It will be seen that by selecting a pair of the slots 7, the bolts 41 in the block can be aligned with the nuts 10 so that the block can be oriented in azimuth so that it will be normal to the axis of the cable which then can be properly connected to the block.

The positions of the threaded holes 13 in the mounting flange 12 are coordinated with the positions of the slots 7 so that the covers 4 and 5 can be locked down with the axis of the cable opening normal to the axis of the cables similarly as the transition block.

In connection with joining the power conductors 37 to the terminals 5, it will be understood that the conductors are brought up through the slots 7 or through another aperture in the plate 2.

I claim:

1. An insert to be mounted in a concrete floor and connected to a cellular raceway having at least a power cell for feeding undercarpet flat conductor cable from the power cell, the insert comprising:

first means to be secured to said power cell;
a mounting plate connected to said means;
a plurality of radially extending slots in said mounting plate, the slots being angularly spaced apart and each slot being for use in mounting nut means to receive a bolt on a transition block connected to an end of flat conductor cable;
at least a pair of nut means to be respectively slidably mounted in a selected pair of said slots;
an adjusting ring including:
an annular support flange;
a plurality of pairs of cover hold-down nut means formed in said support flange;
a plurality of adjusting screws connected with and supporting said adjusting ring and respectively threaded into said first means;
a pair of semi-circular cover plates mounted on said support flange and having facing edges which are slotted to form an elongated opening for receiving a flat conductor cable;
said covers being shiftable on the support flange so that the elongated opening can be oriented in a plurality of different receiving positions to receive, from any one of a plurality of azimuthal directions, a flat conductor cable and said pairs of cover hold-down nut means respectively providing for the covers to be secured to the support flanges in any of said receiving positions;
a transition block for interconnecting the power conductors from a power cell to the conductors of a flat conductor cable, the block including a pair of bolts for connecting the transition block to said mounting plate; and
selected pairs of said slots providing that said transition block connected to flat conductor cable and entering the afterset from any one of a plurality of said azimuthal directions will be aligned whereby said bolts in the transition block can be received by a selective pair of slots and held in position by said nut means mounted in the selected pair.

2. For a concrete floor having a run of flat conductor cable on the surface thereof and a power cell in the floor, an insert to be mounted in the floor on said power cell for use in making an electrical interconnection between power conductors from said power cell and the conductors in the flat conductor cable and providing for the flat conductor cable to exit from the insert and extend along the floor surface in any of a plurality of azimuthal directions, the insert comprising:

a base member configured to be mounted on said power cell;
a mounting plate mounted to said base member;
a plurality of radially extending slots in said mounting plate, the slots being angularly spaced apart and each slot being for use in mounting nut means to receive a bolt of a transition block;
at least a pair of nut means to be respectively slideably mounted in a selected pair of said slots;
a transition block having means to receive conductors of a flat conductor cable and means to receive power conductors from a power cell and electrically interconnect the conductors, the block including a pair of bolts connecting the transition block to said nut means;
selected pairs of slots and said bolt and nut means providing for the transition block to be mounted on said mounting plate in any one of a plurality of positions so that the flat conductor cable extends away from the transition block in any one of a plurality of azimuthal directions;
cover means having an elongated slot; and
an adjusting ring connected to said base member and mounting said cover means so that the cover means can be rotated on the ring to position said slot to receive the flat conductor cable from said transition block and pass the cable outwardly to the floor surface in said azimuthal direction.

3. For a concrete floor having a run of flat conductor cable on the surface thereof and a power cell in the floor, an insert to be mounted in the floor on said power cell for use in making an electrical interconnection between power conductors from said power cell and the conductors in the flat conductor cable and providing for the flat conductor cable to exit from the insert and extend along the floor surface in any of a plurality of azimuthal directions, the insert comprising:

a base member configured to be mounted on said power cell;
a mounting plate mounted on said base member;
an elongated transition block having means to receive conductors of a flat conductor cable and means to receive power conductors from a power cell and electrically interconnect the conductors;
means mounting said transition block on said mounting plate and providing for the transition block to be oriented in any one of a plurality of positions so that the flat conductor cable extends away from the transition block in any one of a plurality of azimuthal directions;
cover means having an elongated slot; and
an adjusting ring connected to said base member and mounting said cover means so that the cover means can be rotated on the ring to position said slot to receive the flat conductor cable from said transition block and pass the cable outwardly to the floor surface in said azimuthal direction.

* * * * *